May 2, 1950     B. B. ROSSI ET AL     2,506,435
RADIATION MEASUREMENT
Filed July 21, 1948     2 Sheets-Sheet 1
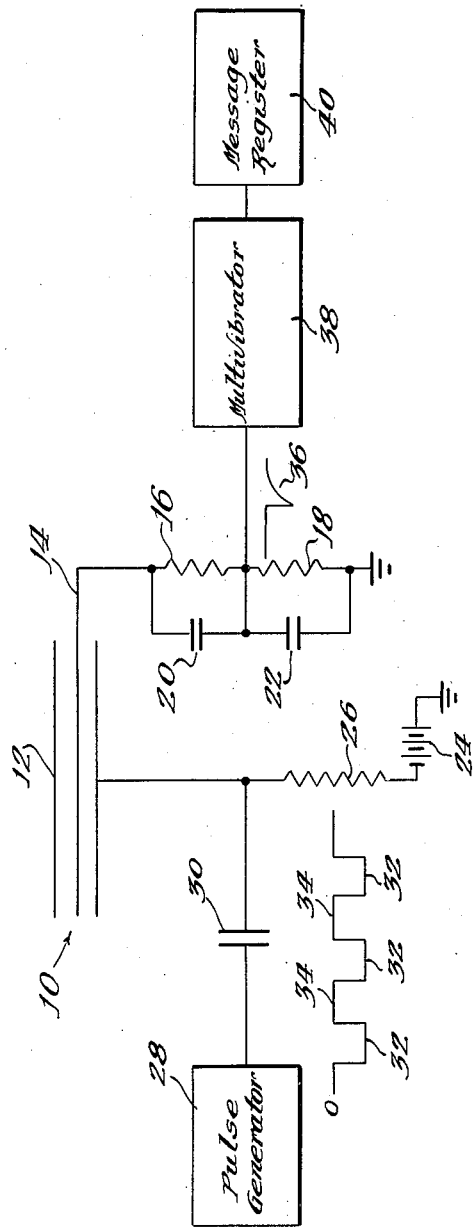
INVENTORS:
Bruno B. Rossi
James S. Allen
BY
Roland A. Anderson
Attorney May 2, 1950   B. B. ROSSI ET AL   2,506,435
RADIATION MEASUREMENT
Filed July 21, 1948   2 Sheets-Sheet 2
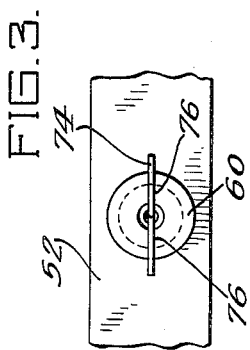
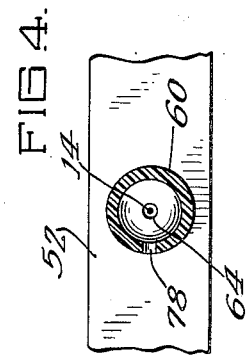
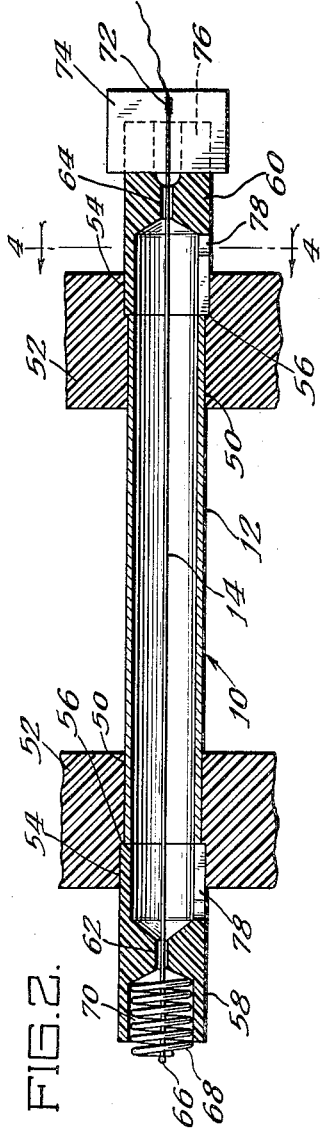
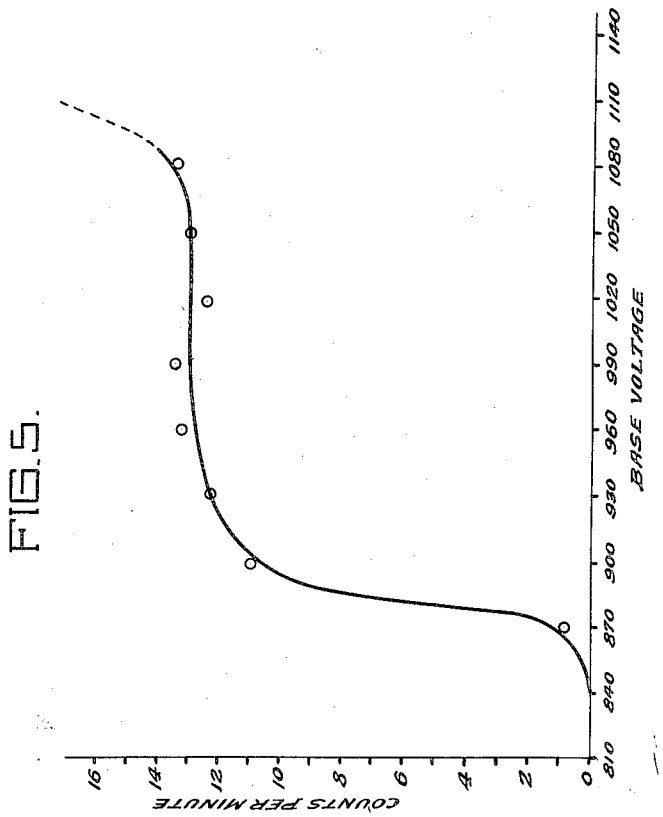
INVENTORS:
Bruno B. Rossi
James S. Allen
BY
Roland A. Anderson
Attorney Patented May 2, 1950

2,506,435

UNITED STATES PATENT OFFICE 2,506,435

RADIATION MEASUREMENT

Bruno B. Rossi, Winchester, Mass., and James S. Allen, Champaign, Ill., assignors to the United States of America as represented by the United States Atomic Energy Commission Application July 21, 1948, Serial No. 39,878

3 Claims. (Cl. 250—83.6)

1

This invention relates to an improvement in methods and apparatus for measuring the intensity of radiations and nuclear particles.

Radiation counters which detect radiations and nuclear particles by utilizing ionization of an ionizing region between two electrodes to produce voltage pulses which indicate the occurrence of ionizing events presently produce relatively small voltage pulses. In transmitting such voltage pulses over long transmission lines, it is necessary to employ amplifiers to boost the signal obtainable at the far end to a usable value.

By the use of the method and apparatus of the present invention, it is possible to measure the intensity of nuclear particles and radiations with radiation counters which produce a signal which may be transmitted over a considerable distance; by the method and apparatus of the invention, radiation counters may be made to produce voltage pulses of an amplitude heretofore unknown in such devices.

Generally the invention lies in pulsed operation of a radiation counter in the voltage region where a spark discharge occurs. In the practice of the invention, the potential impressed between the electrodes of the counter is greater than the sparking potential of the electrode structure and the gaseous ionization medium employed. Such operation relies upon the fact that a potential above the sparking potential will not produce a discharge until an ionizing particle enters the ionizing medium between the electrodes. The spark discharge which is initiated by impingement of an ionizing particle results in a large voltage change across the counter. This large voltage surge may be registered without further amplification, even after transmission over a considerable length of transmission line. When the high voltage is withdrawn, the spark is quenched and the high voltage may again be impressed. No spark, and accordingly no voltage pulse, is produced if no ionizing event occurs within the radiation counter during the time that the interelectrode voltage is above the sparking potential. When such high voltages are impressed at spaced intervals, the number of voltage pulses produced by the radiation counter is proportional to the number of ionizing events occurring within the counter during the spaced intervals.

In accordance with the patent laws, the attached drawing illustrates a preferred embodiment of the invention, and the description below will serve to give a clearer understanding of the invention. In the drawing:

2

Fig. 1 is a schematic diagram, partially in block form, of a system embodying the teachings of the invention;

Fig. 2 is a horizontal sectional view of a counter which may be employed in practicing the invention;

Fig. 3 is an end view in elevation of the counter of Fig. 2;

Fig. 4 is a vertical sectional view taken along the line 4—4 of Fig. 2 in the direction indicated by arrows; and Fig. 5 is a graphic representation of the counting characteristics of the radiation counter of Fig. 2 when employed in the system of Fig. 1.

Referring first to Fig. 1, a radiation counter 10 comprising a cathode 12 and an anode 14 is connected in series with signal resistors 16 and 18, which are shunted by condensers 20 and 22, respectively, and with a source of direct voltage 24. In series with this combination, which is similar to the usual radiation counter circuit employed with an ordinary Geiger-Müller counter, is a voltage source resistor 26. The voltage source resistor 26 is coupled to a square wave pulse generator 28 by a coupling condenser 30. The pulse generator 28 produces square wave pulses as shown at 32, which pulses are negative in polarity. The voltage source 24, which is in series with the voltage source resistor 26, impresses on the cathode 12 a voltage which is negative with respect to the anode 14. The pulses 32, which are superimposed on the direct voltage of the source 24, increase the negative potential of the cathode 12 with respect to the anode 14. The voltage source 24 is of a value below the extinction potential of any ion discharge between the cathode 12 and the anode 14; preferably, however, the voltage source 24 is of sufficient magnitude to quickly collect the ions remaining in the counter 10 after extinction of a discharge by termination of a pulse 32. The pulses 32 are of sufficient amplitude, when added to the voltage of the source 24, to bring the voltage across the counter 10 above the sparking potential. The sparking potential is a potential of such value that discharge in the counter is of avalanche type, that is, the discharge occurs in the gas tube characteristic "continuous discharge" region. Thus any ionizing event such as the emission of an electron from the cathode by impingement of a gamma ray during a pulse 32 produces a spark discharge across the counter 10 which produces a large voltage pulse 36, of the order of 50 volts or more, across the signal resistor 18. These pulses 36 are of sufficient amplitude to trigger a conventional "one shot" multivibrator 38 without the insertion of additional amplification, even where a long transmission line (not shown) is inserted in the circuit. The output pulses of the multivibrator 38 are recorded on a message register 40 in conventional fashion.

In Figs. 2, 3 and 4 is illustrated a simply constructed radiation counter which may be employed as the counter 10 of Fig. 1. The cathode 12 is a platinum tube of 0.125" inside diameter and 0.005" thickness. The anode 14 is a 0.005" tungsten wire. The cathode 12 rests in apertures 50 in insulating support bars 52, of methyl methacrylate polymer. The apertures 50 in the support bars 52 have outer portions 54 of slightly enlarged diameter to form shoulders 56. Resting against the shoulders 56 are methyl methacrylate end caps 58 and 60. The end caps 58 and 60 are axially apertured at 62 and 64, respectively, and the anode 14 extends through these apertures. At one end, the anode wire 14 is soldered to the end 66 of a compressed coiled spring 68, which rests in a cup-shaped cavity 70 in the outer end of the end cap 58. At the other end the anode wire 14 is spot welded at 72 to a rectangular plate 74 of stainless steel which is retained in place by longitudinal slots 76 in the outer end of the end cap 60. The end caps 58 and 60 have wall apertures 78 therein to permit free flow of gas between the interior of the counter and the surrounding atmosphere, which is preferably an inert gas such as argon at a pressure somewhat near atmospheric pressure. A large number of such counters may be mounted in a single assembly within a single gas-tight enclosure (not illustrated). By providing a common gaseous atmosphere, the counters are made to demonstrate similar characteristics.

In Fig. 5 are shown the characteristics of the counter illustrated in Fig. 2 when employed in a circuit such as shown in Fig. 1. In the particular circuit employed, the pulse generator 28 provided a square wave 32 of 450 volts' amplitude and 150 microseconds' duration, with a repetition rate of 6 per second. The counter gas was argon at 59 centimeters Hg. A gamma ray source was placed near the counter tube. Fig. 5, which is similar in appearance to the plateau curve of a conventional Geiger-Müller counter, shows the number of counts per minute registered as a function of the direct voltage of the voltage source 24, designated "Base voltage" in the drawing. It will be seen from Fig. 5 that there is a plateau of approximately 200 volts over which the counting rate is substantially constant.

It will be understood that the embodiment of the invention described above is merely illustrative. Persons skilled in the art will readily adapt the teachings of the invention to a large variety of equivalent devices.

What is claimed is:

1. In radiation measurement apparatus, in combination: a radiation counter having an anode, a cathode and an ionizing medium between said electrodes; and a source of direct voltage having superimposed thereon voltage pulses of alternately positive and negative phase coupled to said electrodes, the voltage pulses having an amplitude sufficient to alternately impress on said electrodes a voltage above the sparking potential and a voltage below the extinction potential thereof.

2. In radiation measurement apparatus, in combination: a radiation counter having an anode, a cathode and an ionizing medium between said electrodes; a source of direct voltage and serially coupled thereto a source of voltage pulses of alternately positive and negative phase coupled to said electrodes, the voltage pulses of positive phase having an amplitude sufficient to impress on said electrodes a voltage above the sparking potential and the pulses of negative phase causing the impression thereon of a voltage below the extinction potential thereof, and means coupled to the counter for registering the ionization pulses occurring therein.

3. In radiation measurement apparatus, in combination: a radiation counter having an anode, a cathode and an ionizing medium between said electrodes; a source of direct voltage impressed upon said electrodes; and a source of alternately positive and negative voltage pulses coupled to said electrodes and superimposed upon said direct voltage, the sum of the voltage pulses and the direct voltage having a magnitude to alternately impress on said electrodes a voltage above the sparking potential and a voltage below the extinction potential thereof.

BRUNO B. ROSSI.
JAMES S. ALLEN.

REFERENCES CITED

The following references are of record in the file of this patent:

UNITED STATES PATENTS

| Number | Name | Date |
|---|---|---|
| 2,418,892 | Lord | Apr. 15, 1947 |